US 9,403,106 B2

(12) United States Patent
Oosthuizen

(10) Patent No.: US 9,403,106 B2
(45) Date of Patent: Aug. 2, 2016

(54) INERTIAL FILTER

(71) Applicant: Petrus Marthinus Oosthuizen, Johannesburg (ZA)

(72) Inventor: Petrus Marthinus Oosthuizen, Johannesburg (ZA)

(73) Assignee: Petrus Marthinus Oosthuizen, Johannesburg (ZA)

( * ) Notice: Subject to any disclaimer, the term of this patent is extended or adjusted under 35 U.S.C. 154(b) by 0 days.

(21) Appl. No.: 14/406,032

(22) PCT Filed: Jun. 5, 2013

(86) PCT No.: PCT/IB2013/054620
§ 371 (c)(1),
(2) Date: Dec. 5, 2014

(87) PCT Pub. No.: WO2013/183005
PCT Pub. Date: Dec. 12, 2013

(65) Prior Publication Data
US 2015/0328566 A1    Nov. 19, 2015

(30) Foreign Application Priority Data
Jun. 8, 2012 (ZA) .................. 2012/04230

(51) Int. Cl.
*B01D 21/00* (2006.01)
*B01D 45/16* (2006.01)
(Continued)

(52) U.S. Cl.
CPC ........ *B01D 21/0042* (2013.01); *B01D 21/0069* (2013.01); *B01D 45/04* (2013.01); *B01D 45/16* (2013.01); *B01D 46/0045* (2013.01); *F24C 15/2035* (2013.01); *Y10T 29/49947* (2015.01)

(58) Field of Classification Search
CPC .... B01D 45/16; B01D 45/08; B01D 21/0042; B01D 21/0069; B01D 46/0045; B01D 21/0003; B01D 21/0048; B01D 21/0063; B01D 21/0066; B01D 2021/0078; F24C 15/2035

USPC .......................... 210/232, 521, 801
See application file for complete search history.

(56) References Cited

U.S. PATENT DOCUMENTS 536,288 A * 3/1895 Mero ............... E04F 21/22
254/15
3,813,855 A * 6/1974 Hill ................. B01D 45/08
55/440
(Continued)

FOREIGN PATENT DOCUMENTS

DE    4427074    2/1996
DE    29921370   2/2000
(Continued)

OTHER PUBLICATIONS
International Search Report PCT/IB2013/054620, 2 pages (Sep. 26, 2013).
(Continued)

*Primary Examiner* — Krishnan S Menon
*Assistant Examiner* — Waqaas Ali
(74) *Attorney, Agent, or Firm* — McCarter & English, LLP; David R. Burns

(57) ABSTRACT

This invention relates to an inertial filter 10 for filtering out particulate material in a fluid. The invention extends to a method of manufacturing an inertial filter 10. The filter 10 includes a pair of opposing baffle plates 12, 14 comprising a first baffle plate 12 and a second baffle plate 14 which are operatively in face-to-face abutment with each other such that the plates 12, 14 are in substantially parallel planes. Each baffle plate 12, 14 is in the form of a layered grille or grating in that it comprises a first (an inner) filter member 16 and a second (an outer) filter member 18. More specifically, the first baffle plate 12 includes an outer filter member 18a and an inner filter member 16a which are press-fitted over one another. Similarly, the second baffle plate 14 comprises an outer filter member 18b and an inner filter member 16b.

3 Claims, 5 Drawing Sheets

(51) Int. Cl.
*F24C 15/20* (2006.01)
*B01D 46/00* (2006.01)
*B01D 45/04* (2006.01)

(56) References Cited

U.S. PATENT DOCUMENTS

| | | | | |
|---|---|---|---|---|
| 3,813,856 A * | 6/1974 | Jensen | B01D 45/08 | 126/299 E |
| 3,870,494 A * | 3/1975 | Doane | B01D 45/08 | 126/299 D |
| 3,938,972 A * | 2/1976 | Sugimura | B01D 45/08 | 55/440 |
| 5,270,092 A * | 12/1993 | Griffith | B32B 3/12 | 428/116 |
| 5,302,174 A * | 4/1994 | Guetersloh | B01D 45/08 | 55/444 |
| 5,320,656 A * | 6/1994 | Hammer | E04B 9/023 | 55/444 |
| 5,342,422 A * | 8/1994 | Wimbock | B01D 45/08 | 55/444 |
| 5,384,100 A * | 1/1995 | Freund | B01D 53/9454 | 422/177 |
| 5,536,288 A * | 7/1996 | De Witt | B01D 45/08 | 55/440 |
| 5,679,120 A * | 10/1997 | Yamada | B01D 45/08 | 55/440 |
| 6,290,742 B1 * | 9/2001 | Pakkala | B01D 45/08 | 55/443 |
| 6,454,825 B1 * | 9/2002 | Cheimets | B01D 45/08 | 55/446 |
| 6,656,244 B1 * | 12/2003 | Galassi | B01D 45/06 | 55/444 |
| 6,833,022 B2 * | 12/2004 | Feisthammel | B01D 45/06 | 55/325 |
| 7,166,140 B2 * | 1/2007 | Entezarian | B01D 45/08 | 55/320 |
| 7,581,539 B2 * | 9/2009 | Aviles | B01D 45/06 | 126/299 D |
| 7,585,345 B2 * | 9/2009 | Smasal | F24C 15/2035 | 55/443 |
| 8,157,894 B2 * | 4/2012 | Kwok | B01D 45/08 | 55/423 |
| 9,175,866 B2 * | 11/2015 | Fuh | B01D 45/06 | |
| 2005/0000199 A1 * | 1/2005 | Carter | F24C 15/2035 | 55/442 |
| 2005/0028498 A1 * | 2/2005 | Entezarian et al. | B01D 50/002 | 55/320 |
| 2007/0056578 A1 * | 3/2007 | Aviles | B01D 45/06 | 126/299 D |
| 2007/0163216 A1 * | 7/2007 | Smasal | F24C 15/2035 | 55/446 |
| 2007/0293133 A1 * | 12/2007 | Marcotte | F24C 15/2035 | 454/67 |
| 2008/0202083 A1 * | 8/2008 | Graham | B01D 45/06 | 55/444 |
| 2010/0230085 A1 * | 9/2010 | Feng | B21D 53/04 | 165/185 |
| 2010/0282694 A1 * | 11/2010 | Menchaca Lobato | B01D 17/0211 | 210/802 |
| 2011/0214565 A1 * | 9/2011 | Kwok | B01D 45/08 | 95/69 |
| 2012/0060820 A1 * | 3/2012 | Sikkenga | B01D 45/08 | 126/1 R |
| 2014/0345461 A1 * | 11/2014 | Sikkenga | B01D 45/16 | 95/272 |
| 2015/0021002 A1 * | 1/2015 | Hoglund | F28F 3/046 | 165/133 |
| 2015/0048030 A1 * | 2/2015 | Barbier | B01D 21/0069 | 210/702 |
| 2015/0101588 A1 * | 4/2015 | Yoon | B01D 45/08 | 126/299 D |
| 2015/0362196 A1 * | 12/2015 | Chen | B01D 45/08 | 55/437 |
| 2016/0025354 A1 * | 1/2016 | Sikkenga | F24C 15/2035 | 95/267 |

FOREIGN PATENT DOCUMENTS

EP 0672444 9/1995
ZA 1995/00135 1/1995

OTHER PUBLICATIONS

International Preliminary Report on Patentability for PCT/IB2013/054620, 17 pages (Jul. 2, 2014).

* cited by examiner

INERTIAL FILTER

FIELD OF INVENTION

This invention relates to an inertial filter primarily for use in extracting matter from fluids.

BACKGROUND OF INVENTION

Inertial filters which make use of the inertia of particulate matter in a fluid passing through the filter to separate the particulate matter from the fluid are well known. South African Patent No. 1995/00135 discloses such an inertial filter, the entire disclosure of which is incorporated herein by reference.

Due to the complex cross-sectional profiles of some inertial filters, such as that of Patent No. 1995/00135, the manufacturing process of the filter is cumbersome and complex which consequentially gives rise to costs. In the case of the filter of South African Patent No. 1995/00135, the reason for increased manufacturing costs is because the filter comprises a number of separate, individual elements which need to be joined together to construct the filter.

It is an object of this invention to provide a filter which the Inventor believes will alleviate the problem described above.

SUMMARY OF INVENTION

According to a first aspect of the invention, there is provided an inertial filter which includes:
   a pair of operatively adjacent baffle plates which are arranged face-to-face, the baffle plates together defining a plurality of convoluted or serpentine fluid passageways therethrough, wherein each baffle plate includes:
      a first filter member which includes a plurality of first deflector plates arranged such that first apertures are defined between adjacent first deflector plates; and
      a second filter member which includes a plurality of second deflector plates arranged such that second apertures are defined between adjacent second deflector plates,
      the filter members of each baffle plate being arranged such that the second deflector plates are received in the first apertures and the first deflector plates are received in the second apertures, thereby to produce a series of interleaved deflector plates.

The adjacent baffle plates in the pair may be arranged in parallel planes, the direction of fluid flow through the fluid passageways being transverse to or oblique to the planes. The pair of adjacent baffle plates may comprise a first baffle plate defining a first plane and a second baffle plate defining a second plane which is parallel to the first plane, the direction of fluid flow through the fluid passageways being transverse to or oblique to the first and second planes.

The first deflector plates of the first filter member may be operatively obliquely inwardly disposed. Likewise the second deflector plates of the second filter member may be operatively obliquely inwardly disposed. The first and second deflector plates may have substantially the same shape and configuration, but with the respective deflector plates offset or half out of phase.

First deflector plates may be substantially parallel to one another and regularly spaced apart. In similar fashion, second deflector plates may be substantially parallel to one another and regularly spaced apart. Hence, the deflector plates of a baffle may be parallel and regularly spaced apart.

A deflector plate may be elongate and extend laterally and may be inclined with respect to the plane of the baffle plate. Each deflector plate may be flanged.

The baffle plates may be operative mirror images of one another. The baffle plates may be fixed in place by a peripherally extending housing or framework. The housing may be removably secured around the baffle plates thereby to secure the first and second filter members together.

Operatively lower margins of the baffle plates may cooperate with the housing to form at least one drainage passage for collection or expulsion of filtered material.

Each fluid passageway may define at least three areas of differential fluid velocity such that particulate material entrained in a fluid flowing through said areas may be precipitated out.

The filter may be bi-directional. The baffle plates may be configured to abut in at least two different configurations such that the fluid passageways defined through the filter are different in each of the configurations.

The baffle plates may be arranged in a first configuration in which corresponding flanged edges of the deflector plates within the respective baffle plates are in register, when the baffle plates are viewed in transverse cross-section.

The baffle plates may be arranged in a second configuration in which corresponding flanged edges of the deflector plates within the respective baffle plates are staggered relative to one another when the baffle plates are viewed in transverse cross-section.

Each filter member may be pressed from a single sheet of metal.

The invention extends to a method of manufacturing an inertial filter which includes a pair of baffle plates, the method including:
   pressing two identical first filter members, one for each baffle plate, each first filter member including a plurality of first deflector plates arranged such that first apertures are defined between adjacent first deflector plates;
   pressing two identical second filter members, one for each baffle plate, each second filter member including a plurality of second deflector plates arranged such that second apertures are defined between adjacent second deflector plates;
   creating a pair of baffle plates, each baffle plate being created by arranging first and second filter members together such that the second deflector plates are received in the first apertures and the first deflector plates are received in the second apertures, thereby to produce a series of interleaved deflector plates; and arranging the baffles plates face-to-face, the baffle plates together defining a plurality of convoluted or serpentine fluid passageways therethrough.

The method may include adjusting a die to toggle it between a die for the first filter members and a die for the second filter members.

BRIEF DESCRIPTION OF DRAWINGS

The invention will now be further described, by way of example, with reference to the accompanying drawings.

In the drawings.

DETAILED DESCRIPTION OF PREFERRED EMBODIMENT

Figure 1:
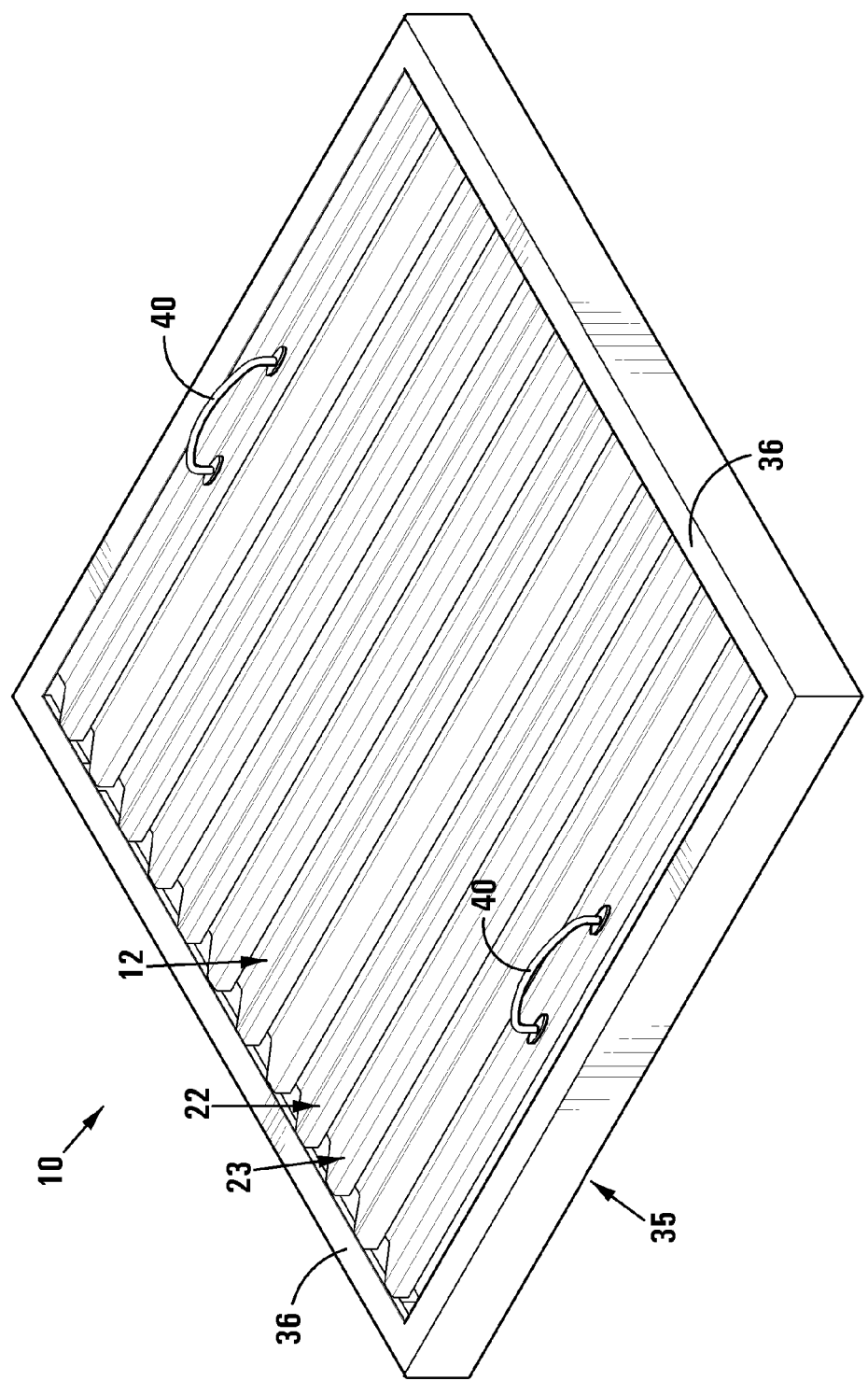
FIG. 1 shows a three-dimensional view of an assembled filter in accordance with the invention.

In the figures, reference numeral 10 refers generally to an inertial filter for filtering out particulate material in a fluid passing through the filter in accordance with the invention.

In the example embodiment of the filter 10 shown in the figures, the filter 10 has a square outline when seen in plan view. It is to be understood that the filter 10 may be rectangular or in any other practical shape that may be required for a particular application of the filter 10.

Figure 2:
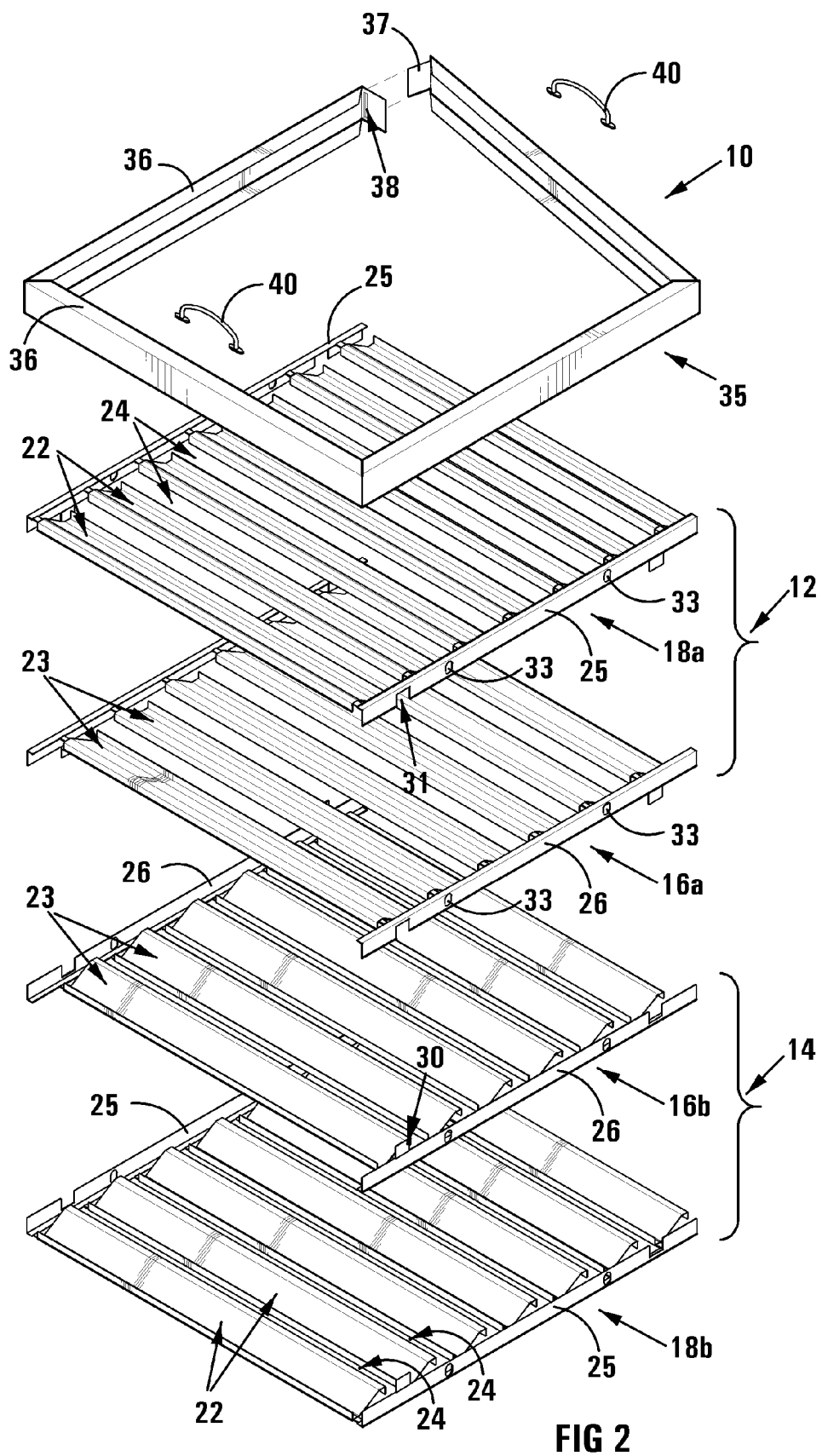
FIG. 2 shows a three-dimensional exploded view of the filter of FIG. 1.
Figure 3:
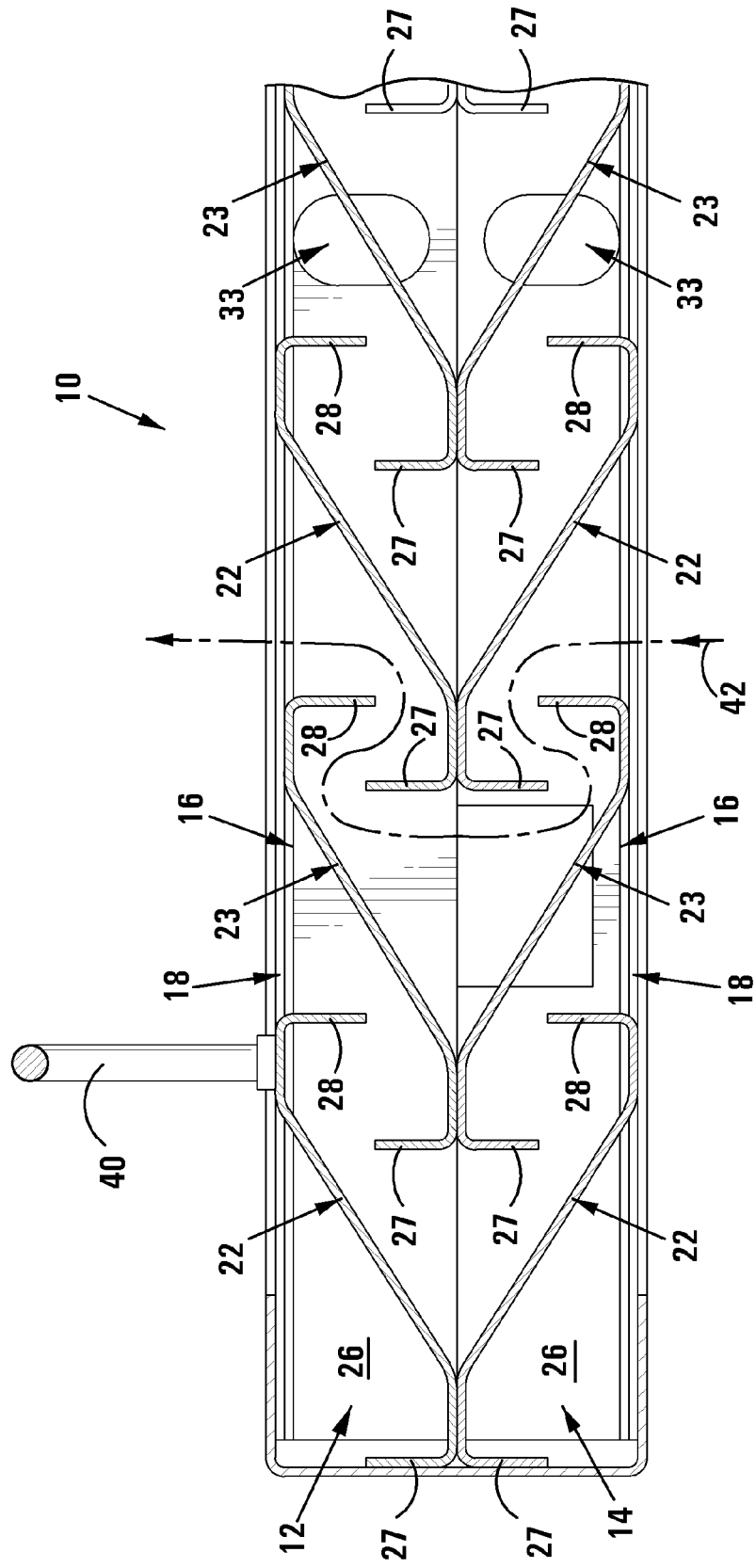
FIG. 3 shows a transverse cross-sectional view of part of the filter in accordance with the invention in a first configuration.
Figure 4:
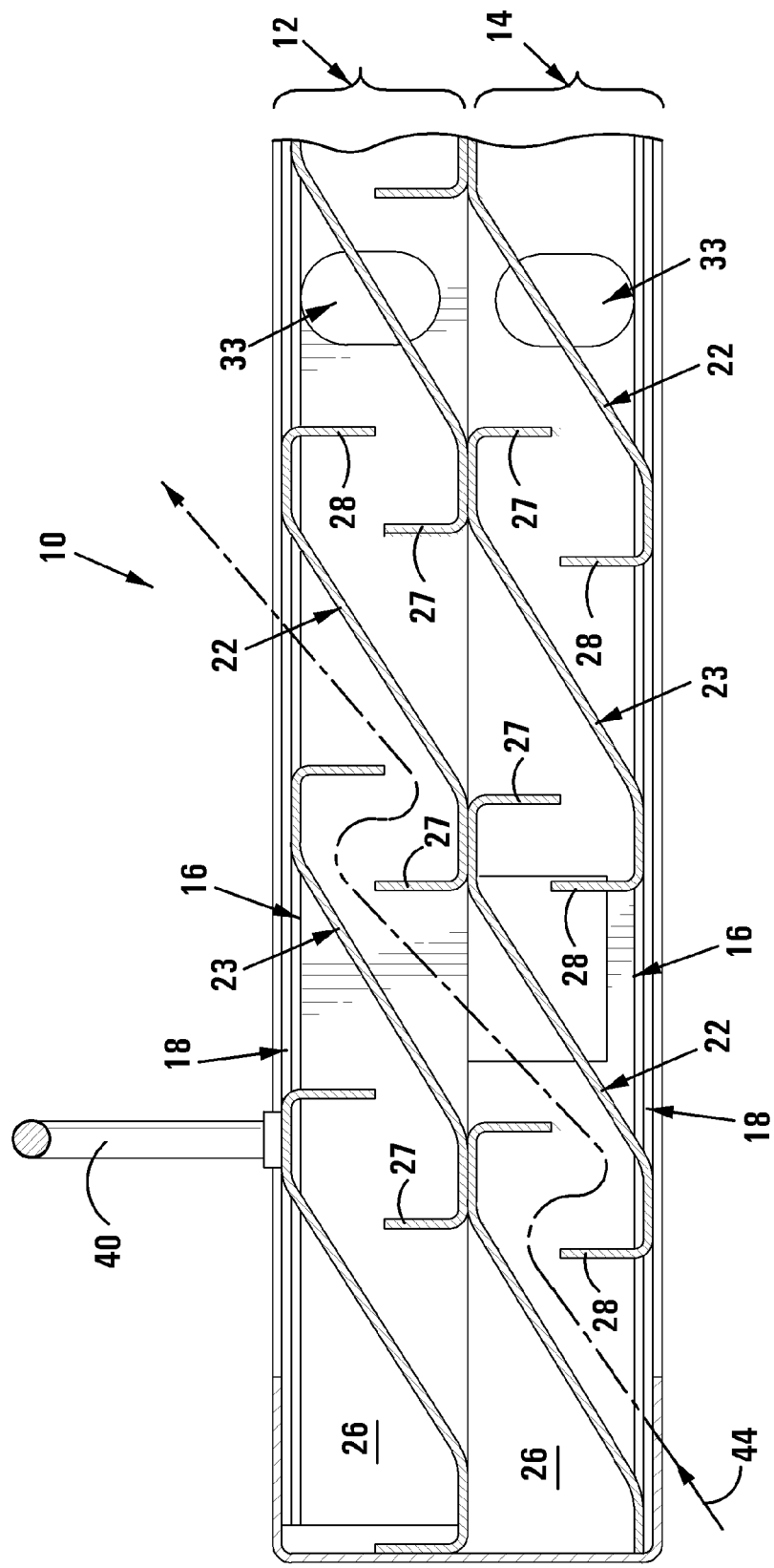
FIG. 4 shows a transverse cross-sectional view of part of the filter in accordance with the invention in a second configuration.

Referring to FIGS. 2 to 4, the filter 10 includes a pair of opposing baffle plates 12, 14 comprising a first baffle plate 12 and a second baffle plate 14 which are operatively in face-to-face abutment with each other such that the plates 12, 14 are in substantially parallel planes.

Each baffle plate 12, 14 is in the form of a layered grille or grating in that it comprises a first (an inner) filter member 16 and a second (an outer) filter member 18. More specifically, the first baffle plate 12 includes an outer filter member 18a and an inner filter member 16a which are press-fitted over one another. Similarly, the second baffle plate 14 comprises an outer filter member 18b and an inner filter member 16b. The outer filter members 18a, 18b used in each baffle plate 12, 14 are in fact identical components which are oppositely orientated in use. Likewise, the inner filter members 16a, 16b are identical and oppositely orientated in use.

With specific reference to FIG. 2, the outer filter member 18 which is in the form of a grille includes a plurality of parallel, elongate second (or outer) deflector plates or slats 22 which extend laterally between opposing flanges 25 of the outer filter member 18. An elongate aperture 24 (i.e. a second or outer aperture) is defined between adjacent outer deflector plates 22. The outer deflector plates 22 are evenly or regularly spaced apart such that the outer apertures 24 formed between adjacent outer deflector plates 22 are equal. The flanges 25 of the outer filter member 18 are operatively inwardly orientated at a right angle to a longitudinal axis of the deflector plates 22.

In similar fashion, the inner filter member 16, which is also in the form of a grille, includes a plurality of parallel, elongate first (or inner) deflector plates or slats 23 which have essentially the same shape and configuration as the outer deflector plates 22 of the outer filter member 18 and which extend laterally between opposing, operatively inwardly orientated flanges 26 of the inner filter member 16.

Each deflector plate 22, 23 has oppositely orientated flanged edges, which include an operatively inwardly disposed, outwardly facing edge 27 and an opposite, inwardly facing edge 28, which give rise to a roughly S-shaped cross-sectional profile of the deflector plates 22, 23 (see FIGS. 3 and 4).

The outer filter members 18a, 18b are configured snugly to fit over an inner filter member 16a, 16b such that the flanges 26 of the inner filter member 16 are received between and abut or are closely spaced to the flanges 25 of the outer filter member 18a, 18b. The inner filter members 16a, 16b are accordingly sandwiched between the outer filter members 18a, 18b as can be best seen in the exploded view of the filter 10 shown in FIG. 2.

Figure 5:
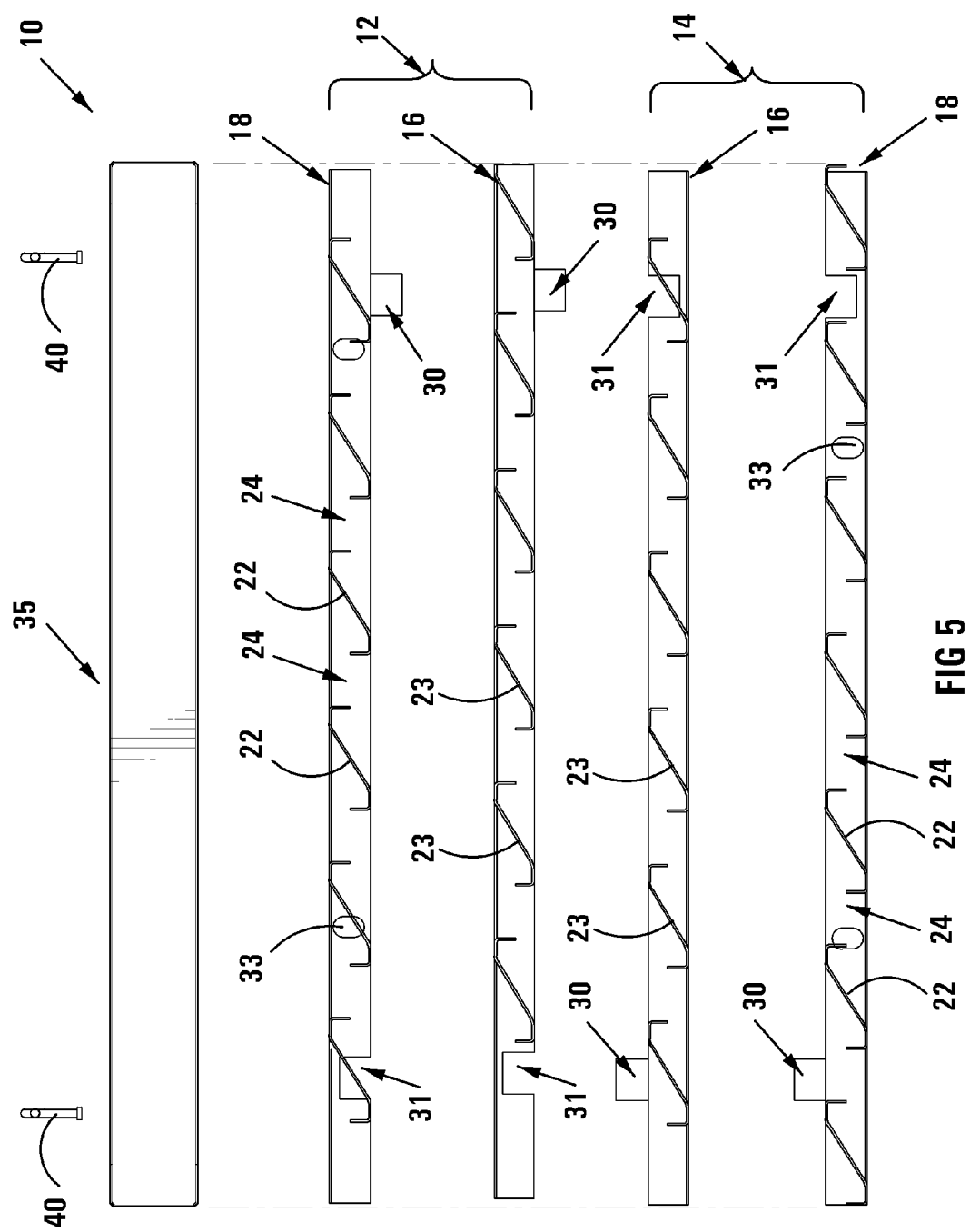
FIG. 5 shows an exploded, transverse cross-sectional view of the filter in the second configuration.

As can be seen in FIG. 5, when the outer and inner filter members 18, 16 are positioned one above the other such that the ends of the filter members 18, 16 are in register, the respective deflector plates 22, 23 are offset. Accordingly, when assembling the respective baffle plates 12, 14, the inner filter member 16 is displaced upwardly or towards the outer filter member 18 and longitudinally relative to the outer filter member 18 such that the inwardly facing edges 28 of the inner deflector plates 23 pass through the outer apertures 24 formed between the flanged edges 27, 28 of adjacent outer deflector plates 22 of the outer filter member 18. Therefore, once the filter members 18, 16 are in position the edges 27, 28 of adjacent deflector plates 22, 23 overlap as can best be seen in FIGS. 3 and 4.

Each flange 25, 26 of each filter member 16, 18 includes a lug 30 and socket 31 which respectively interface with a complemental socket 31 and lug 30 formed on an operatively opposing filter member 18, 16 thereby serving to locate the filter members 18, 16 relative to one another (see FIG. 5). The filter members 16, 18 further include drainage holes 33 formed in the flanges 25, 26 of the filter members 18, 16 for draining precipitated particulate material from the filter 10. The drainage holes 33 in the outer and inner filter members 18, 16 are disposed such that when the filter members 18, 16 are assembled, the holes 33 are in register allowing the filtered material to drain through the holes 33 and to be expelled from the filter 10.

The baffle plates 12, 14 are enclosed by a peripheral housing or frame 35 (see FIG. 1) which is in the form of a length of U-shaped channel which is bent around corners of the baffle plates 12, 14 such that flanges 36 of the channel face inwardly. A free end of the housing 35 includes a right angled lip 37 which passes through a corresponding slot 38 formed in an opposite end of the housing 35 in order to secure the housing 35 around the baffle plates 12, 14 (see FIG. 2). It is to be understood that the plates 12, 14 and housing 35 may be press-fitted or hand-fitted together thereby allowing the filter 10 to be dismantled for cleaning purposes or alternatively the elements may be spot welded together thereby constituting an integrated unit.

In order to assist in handling of the filter 10, it includes a pair of U-shaped handles 40.

The baffle plates 12, 14 of the filter 10 may interface in at least two different configurations, each configuration defining a different fluid passageway. A first possible configuration is illustrated in FIG. 3. In FIG. 3, the fluid passageway through the filter 10 is indicated by line 42. As a fluid passes through the passageway 42 and negotiates the bends, the fluid velocity at the outer margin of the bend is greater than the fluid velocity at the inner margin of the bend. This difference in velocity coupled with the change in direction of the fluid urges particulate matter in the fluid towards the outer margin of the bend. When the fluid negotiates an oppositely directed bend, the fluid velocity is reduced and the particulate matter is precipitated out and collected in the drainage channel formed towards an operatively lower margin of the filter 10. In the first configuration, corresponding flanged edges 27, 28 of the deflector plates 22, 23 within the respective baffle plates 12, 14 are in register, when the baffle plates 12, 14 are viewed in transverse cross-section as is shown in FIG. 3.

A second configuration of the baffle plates 12, 14 is shown in FIG. 4, the fluid passageway being indicated by line 44. In this configuration, the second baffle plate 14 has been rotated through 180 degrees when compared with the first configuration shown in FIG. 3. In the second configuration, corresponding flanged edges 27, 28 of the deflector plates 22, 23 within the respective baffle plates 12, 14 are staggered relative to one another.

A major advantage of the inertial filter 10 of the present invention over existing filters is that it is considerably simpler and cheaper to manufacture and assemble. The specific shape and configuration of the respective filter members 18, 16 allow each member to be pressed or machined from a single sheet of metal. Owing to the fact that the outer filter members 18a, 18b are identical and the inner filter members 16a, 16b are identical, only two jigs are required to create the required filter members 18a, 18b, 16a, 16b thus resulting in a cost saving because less moulds and tools are required to manufacture the filter parts. By way of development, a single jig with a displaceable part could even be used to manufacture the inner and outer filter members 16, 18. A further advantage of having fewer filter parts is less time is required to assemble each filter. Consequentially a greater number of filters can be produced in a shorter time period.

The invention claimed is:

1. A method of manufacturing an inertial filter which includes a pair of baffle plates, the method including:
    pressing two identical first filter members, one for each baffle plate, each first filter member including a plurality of first deflector plates arranged such that first apertures are defined between adjacent first deflector plates;
    pressing two identical second filter members, one for each baffle plate, each second filter member including a plurality of second deflector plates arranged such that second apertures are defined between adjacent second deflector plates;
    creating a pair of baffle plates, each baffle plate being created by press-fitting first and second filter members together such that the second deflector plates are received in the first apertures and the first deflector plates are received in the second apertures, thereby to produce a series of interleaved deflector plates;
    arranging the baffles plates face-to-face, and
    removably securing the baffle plates together using a peripherally extending housing, thereby allowing the filter members to be dismantled for cleaning purposes, the baffle plates together defining a plurality of convoluted or serpentine fluid passageways therethrough.

2. A method as claimed in claim 1, which includes adjusting a die to toggle it between a die for the first filter members and a die for the second filter members.

3. A method as claimed in claim 2, which includes arranging the baffle plates face-to-face such that the baffle plates together define a plurality of convoluted or serpentine fluid passageways therethrough, each baffle plate including:
    a first filter member which includes a plurality of first deflector plates arranged such that first apertures are defined between adjacent first deflector plates; and
    a second filter member which includes a plurality of second deflector plates arranged such that second apertures are defined between adjacent second deflector plates,
    the filter members of each baffle plate being arranged such that the second deflector plates are received in the first apertures and the first deflector plates are received in the second apertures, thereby to produce a series of interleaved deflector plates.

* * * * *